United States Patent
Eichhorn

(10) Patent No.: US 10,909,013 B2
(45) Date of Patent: Feb. 2, 2021

(54) TTCN-BASED TEST SYSTEM AND METHOD FOR TESTING TEST-CASES, NON-TRANSITORY COMPUTER-READABLE RECORDING MEDIUM

(71) Applicant: Rohde & Schwarz GmbH & Co. KG, Munich (DE)

(72) Inventor: Michael Eichhorn, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 37 days.

(21) Appl. No.: 16/161,402

(22) Filed: Oct. 16, 2018

(65) Prior Publication Data

US 2020/0117563 A1   Apr. 16, 2020

(51) Int. Cl.
- *G06F 11/00*    (2006.01)
- *G06F 11/26*    (2006.01)
- *G06F 11/263*   (2006.01)
- *G06F 11/36*    (2006.01)
- *G06F 11/277*   (2006.01)

(52) U.S. Cl.
CPC .......... *G06F 11/261* (2013.01); *G06F 11/263* (2013.01); *G06F 11/277* (2013.01); *G06F 11/3612* (2013.01); *G06F 11/3684* (2013.01); *G06F 11/3692* (2013.01)

(58) Field of Classification Search
CPC .. G06F 11/261; G06F 11/3684; G06F 11/263; G06F 11/3692; G06F 11/277; G06F 11/3612
USPC ........................................ 714/724, 741, 742
See application file for complete search history.

(56) References Cited

U.S. PATENT DOCUMENTS

| | | | | |
|---|---|---|---|---|
| 7,797,590 B2* | 9/2010 | Kaksonen | ............... | H04L 43/50 714/703 |
| 2006/0090100 A1* | 4/2006 | Holzapfel | ............. | G06F 11/263 714/38.1 |
| 2007/0220342 A1* | 9/2007 | Vieira | ................. | G06F 11/3688 714/33 |
| 2007/0250799 A1* | 10/2007 | Bunin | ................. | G06F 30/3323 716/106 |
| 2008/0109475 A1* | 5/2008 | Burmester | ............ | G06F 40/151 |
| 2008/0148236 A1* | 6/2008 | Huang | ................ | G06F 11/3684 717/124 |
| 2013/0067437 A1* | 3/2013 | Chen | .................... | G06F 11/3672 717/124 |
| 2016/0294668 A1* | 10/2016 | Fuessel | ................. | H04L 43/045 |
| 2017/0324617 A1* | 11/2017 | Prasad | .................. | H04W 24/06 |

\* cited by examiner

*Primary Examiner* — Kyle Vallecillo
*Assistant Examiner* — Osman M Alshack
(74) *Attorney, Agent, or Firm* — Westman, Champlin & Koehler, P.A.

(57) ABSTRACT

A TTCN-based test system for testing test-cases is provided. The test system includes a test executable which includes a compiled TTCN code. A simulated device under test (DUT) includes a pre-recorded log-file which describes at least partially the behavior of the simulated DUT. A test runtime interface is provided between the test executable and the simulated DUT. A test computer (PC) is configured to perform the testing by executing the compiled TTCN code and by exchanging via the test runtime interface protocol messages with the simulated DUT during the execution of the compiled TTCN code. A TTCN-based test method for testing test-cases and a non-transitory computer-readable recording medium is also provided.

18 Claims, 2 Drawing Sheets

TTCN-BASED TEST SYSTEM AND METHOD FOR TESTING TEST-CASES, NON-TRANSITORY COMPUTER-READABLE RECORDING MEDIUM

FIELD OF THE INVENTION

The present invention relates to a TTCN-based test system and method for testing test-cases. The invention further relates to a non-transitory computer-readable recording medium.

TECHNICAL BACKGROUND

The present invention is in particular in the technical environment of performance tests, such as protocol tests or conformance tests of mobile communication devices. In the testing, quite a variety of programming and scripting languages are used, for instance, TTCN-3 whereas TTCN-3 stands for Testing and Test Control Notation Version 3. The present invention and its underlying problem are hereinafter described on the basis of the TTCN-3 programming language, however, without restricting the invention thereto.

TTCN-3 is an international standardized programming language, which is maintained by the European Telecommunications Standards Institute (ETSI). TTCN-3 is presented as a modern abstract language, which is test oriented and provider independent. TTCN-3 is designed to be flexible enough to be applied to any kind of reactive system tests. Its abstraction, scalability and standardization of interfaces make TTCN-3 a good choice for conformance tests.

Currently, it is necessary to first develop a special test system and the associated TTCN code. Only after that, this test system and TTCN code can be used for test suites on real test objects, i.e. on real devices under test (DUT). However, up to now the execution of the compiled TTCN code for reproducing and verifying test-cases is only possible by using the real DUT, sometimes only on customer premises. This turns out to be very inefficient and time-consuming.

SUMMARY OF THE INVENTION

Against this background, there is the need to enable TTCN-based tests in the absence of a real device under test and even before the test code is fully developed and integrated within a test system.

Accordingly, the present invention provides according to aspects of the present invention a TTCN-based test system, a TTCN-based test method for testing test-cases and a non-transitory computer-readable recording medium having the features of the independent claims.

According to a first aspect of the invention, a TTCN-based test system for testing test-cases is provided, the test system comprising: a test executable comprising a compiled TTCN code, a simulated device under test (DUT) comprising a pre-recorded log-file which describes at least partially the behavior of the simulated DUT, a test runtime interface between the test executable and the simulated DUT, a test computer (PC) which is configured to perform the testing by executing the compiled TTCN code and by exchanging via the test runtime interface protocol messages with the simulated DUT during the execution of the compiled TTCN code.

According to a second aspect of the invention, a TTCN-based test method for testing test-cases, the test method comprising: providing a compiled TTCN code on a test executable; providing a pre-recorded log-file which describes at least partially the behavior of a simulated device under test (DUT); and testing at least one test-case by executing the compiled TTCN code and by exchanging messages with the simulated DUT during the execution of the compiled TTCN test code via a test runtime interface between test executable and simulated DUT protocol.

According to a third aspect of the invention, a TTCN-based test method for testing test-cases, the test method comprising: providing a compiled TTCN code on a test executable; providing a pre-recorded log-file which describes at least partially the behavior of a simulated device under test (DUT); and testing at least one test-case by executing the compiled TTCN code and by exchanging messages with the simulated DUT during the execution of the compiled TTCN test code via a test runtime interface between test executable and simulated DUT protocol.

The present invention is based on the knowledge that the execution of the compiled TTCN code using a real DUT is sometimes inefficient and time-consuming, in particular in those situations where the hardware to be tested is not available.

The present invention is based on the idea that these tests may also be done locally on a test computer. It is only necessary to provide relevant data of the hardware to be tested which is done according to the present invention by defining a simulated device under test or shortly simulated DUT.

According to the present invention, this simulated DUT is described using pre-recorded log-files which are generated from a test logging interface. During the test, the test computer executes the TTCN codes provided by a test executable and exchanges with the simulated DUT protocol messages which comprise the pre-recorded log-files. As such, for testing purposes the test computer replays these TTCN log-files supplied by the simulated DUT during the exchange of the protocol messages between test executable and simulated DUT.

The protocol messages are real messages that are exchanged in a real test case between the test executable and the real DUT. In the real test case, these protocol messages are written into the log-file via the so called TCI test logging interface. According to the present invention, the protocol messages are now exchanged for simulation purposes between the test executable and the simulated DUT via the test runtime interface (TRI).

In computing, a log file is a file that records events that occur in an operating system or in a software or that records messages between different users of communication software. In the simplest case, messages are written to a single log file. The test logging (TL) is an entity which provides logging information about test execution, including also the information provided by the TTCN log statement. TCI denotes the TTCN-3 control interfaces and comprises four interfaces that define the interaction of the test executable with the test management, the coding and decoding, the test component handling and the logging in a test system.

One main benefit of this solution is that no dedicated test hardware (e.g. a CMW test apparatus of Rohde & Schwarz) is needed to reproduce test-cases and test situations. Instead, this test case may be simulated on a test computer.

Further, there is no more the need to perform the test on the site of the customer, since it may be done wherever the test computer is located. As the present solution is also very reliable and safe, it may also be used in regression environments.

Advantageous configurations and developments emerge from the further dependent claims and from the description with reference to the figures of the drawings.

In one aspect, a test logging interface (TLI) is provided to generate the pre-recorded log-file.

According to a further preferred aspect, the test system is a TTCN-3 based test system and the test executable comprises a compiled TTCN-3 code. TTCN-3 stands for Testing and Test Control Notation version 3 and is defined e.g. in ISO/IEC 9646-1.

In a further preferred configuration, the test PC is configured to provide the simulated DUT, i.e. the simulated DUT is an integral part of the test PC. As such, the test PC comprises all relevant features which are necessary for running test suites and for testing a test case. For test purposes, there is only the need to connect the test PC with the test executable for receiving the test code. Preferably, also the test executable is part of the test PC.

In a preferred development, the test executable comprises compiled TTCN code and in addition to that at least one codec implementation. A codec denotes an encoder/decoder entity used for encoding and decoding data to be transmitted and received, respectively.

In a particularly preferred aspect, the test computer is further configured to determine programming defects in the compiled TTCN code during the execution of the compiled TTCN code. This may be done for example by firstly testing a test case on a real DUT. This generates a log-file with a verdict at the end. Then the same test case is executed on the simulated DUT which again outputs a verdict at the end. If this verdict is PASS, there is no defect. If the verdict is not PASS, there is a defect. Typically, a large number of test cases are executed one after the other. The programming defects are, e.g. a change of common code. The common code defines a code that is shared by several test-cases. A test-case is a sequence of sends and receives. A test-case describes an elementary, functional software test that is used to check a guaranteed property of a specific test device e.g. in a specification. A test-case is a specification of the inputs, execution conditions, testing procedure, and expected results that define a single test to be executed to achieve a particular software testing objective, such as to exercise a particular program path or to verify compliance with a specific requirement.

In a further preferred aspect, the test computer is configured to perform the test as a regression test. Regression testing means re-running functional and non-functional tests in order to ensure that previously developed and tested software still performs properly within a guaranteed scope after a software change. Regression testing is in particular used for software enhancements, configuration changes, and even substitution of electronic components. Since regression test suites tend to grow with each detected defect or update, the corresponding testing would be consequently more and more time consuming. In this situation the present invention offers a main benefit, as this update testing may be done locally on the test computer and preferably by using the test information and results of former test suites. This reduces the overall time and effort for testing significantly.

According to a particularly preferred aspect, the test computer is further configured to determine programming defects in the codec implementation. The error detection for the codec implementation is similar to the error detection of the compiled TTCN code as sketched above. If there is an error in the codec implementation no PASS will be delivered. The codec can then be adapted until the faulty decoding step is successful. Such detected and determined programming defects may be programming errors, a missing feature in the used code or codec and the like. A missing feature could be for instance a new feature which is currently not yet implemented in the tested codec. The test may also be expanded such that also future configurations can be tested. This way, an additional regression test is no more necessary when the missing feature is added in the future.

In a preferred development, the test computer is further configured to modify the pre-recorded log-file. In particular, the test computer modifies the pre-recorded log-file such to allow simulation of future features which are not yet implemented on the DUT. Accordingly, it is possible to test not yet available DUTs of future releases. The modifying of the log-files is done preferably automatically, but may also be performed manually.

In a further aspect of the test method, the pre-recorded log-file is recorded based on the execution of a real test-case on a real DUT.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which.

Figure 1:
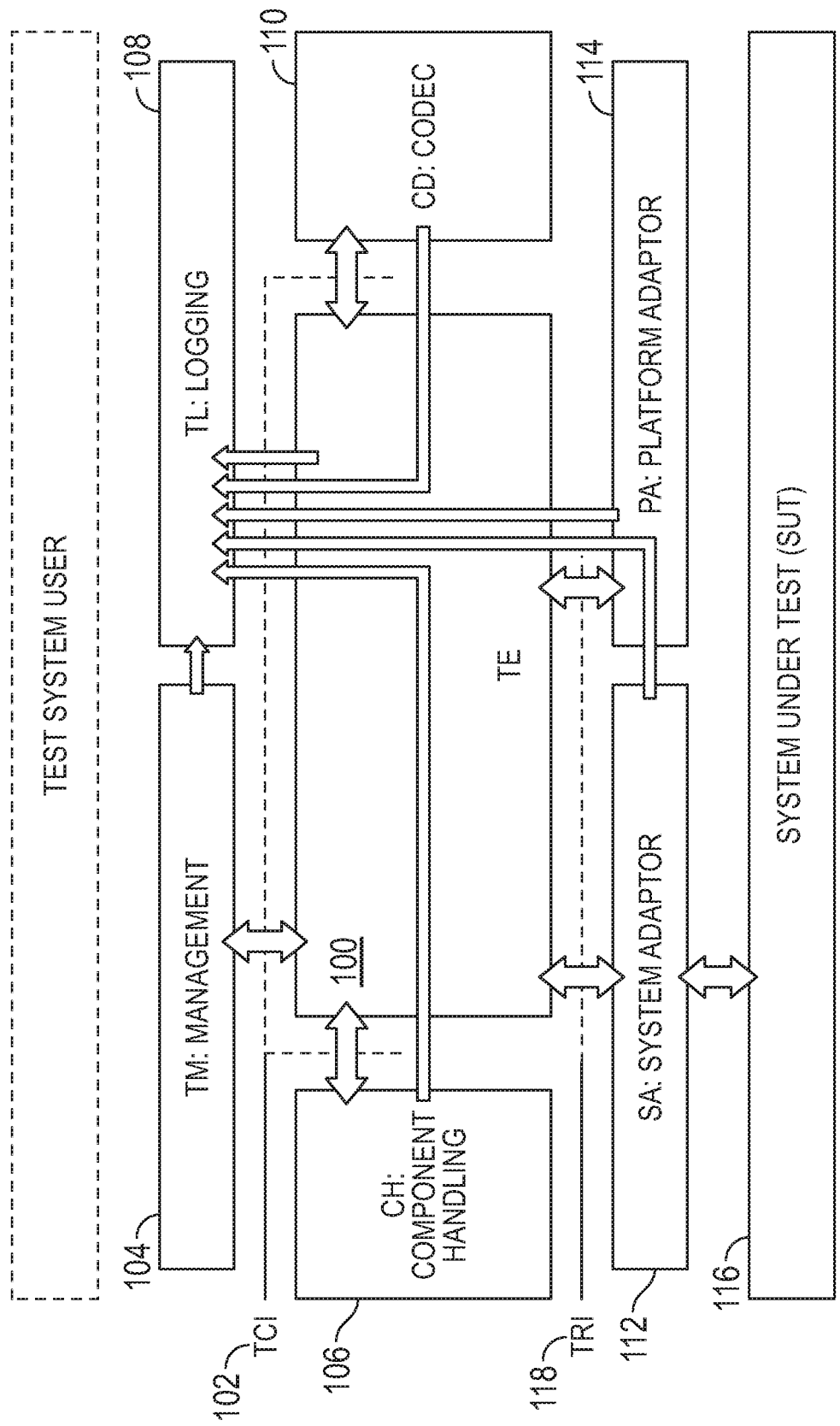
FIG. 1 shows a block diagram illustrating the general structure of a TTCN-3 test system according to the ETSI standard (ES 201 873-6)

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a block diagram illustrating the general structure of a TTCN-3 test system according to the ETSI standard (ES 201 873-6).

As shown in FIG. 1, the TTCN-3 Executable (TE) 100, also shortly referred to as test executable or as Executable Test Suite (ETS), interprets and executes TTCN-3 modules. TE 100 denotes the part of a test system that deals with the interpretation and/or execution of a executable TTCN-3 test case (ETS). Various TE structural elements can be identified, such as control, behavior, components, types, values and queues. The structural elements within the TE represent functionality that is defined within a TTCN-3 module or by the TTCN-3 standard itself. For example, the structural element "Control" represents the control part within a TTCN-3 module, while the structural element "Queues" represents the requirement on a TE that each port of a test component maintains its own port queue. While the first is specified within a TTCN-3 module, the latter is required by the TTCN-3 specification.

The TTCN-3 Control Interfaces (TCI) 102 defines the interaction between the TE 100 and the Test Management and Control (TMC). The TMC denotes a set of entities providing test management and control. The TMC is typically an implementation of TCI and consists of the Test Management (TM) 104, the Component Handling (CH) 106, the Test Logging (TL) 108 and the Coding/Decoding (CD) 110. The TE would typically correspond in a test system implementation either to the TTNC-3 code produced by a TTCN-3 compiler or by a TTCN-3 interpreter.

The TE may be executed in a centralized or in a distributed manner, i.e. on a single test device or across several test devices, respectively. Although the structural entities of the TE implement a complete TTCN-3 module, single structural entities might be distributed over several test devices.

The TE implements a TTCN-3 module on an abstract level. The other entities of a TTCN-3 test system make these abstract concepts concrete. For example, the abstract concept of sending a message or receiving a timeout cannot be implemented within the TE. The remaining part of the test system implements the encoding of the message and its sending over concrete physical means or measuring the time and determining when a timer has expired, respectively.

The remaining part of the TTCN-3 test system, which deals with aspects that cannot be concluded from information present in original Abstract Test Suites (ATS) alone, can be decomposed into Test Management (TM) 104, SUT Adaptor (SA) 112 and Platform Adaptor (PA) 114 entities. In general, these entities cover a test user interface, test execution control, test event logging, as well as communication with SUT 116 and timer interpretation.

The PA 114 is an entity that adapts the TE 100 to a particular execution platform. The SA 112 is an entity that adapts the TTCN-3 communication operations with the SUT 116 based on an abstract test system interface. It implements the real test system interface. The TM 104 is an entity which provides a user interface to the administration of the TTCN-3 test system and the TL 108 is an entity which provides logging information about test execution (including also the information provided by the TTCN-3 log statement). The TTCN-3 Runtime Interface (TRI) 118 comprises two interfaces that define the interaction of the TE 100 between the System Under Test (SUT) 116 and the PA 114 and the SA 112 in a test system.

The logging interface provides logging capabilities to all elements of the test system architecture, i.e. the TE 100, the TM 104, the Component Handling (CH) 106, the Codec (CD) 110, the SA 112 and the PA 114 are able to log information on the test execution via the Test Logging (TL) 108. The SA 112 and PA 114 and their interaction with the TE 100 are defined in the standard (ES 201 873-5).

Figure 2:
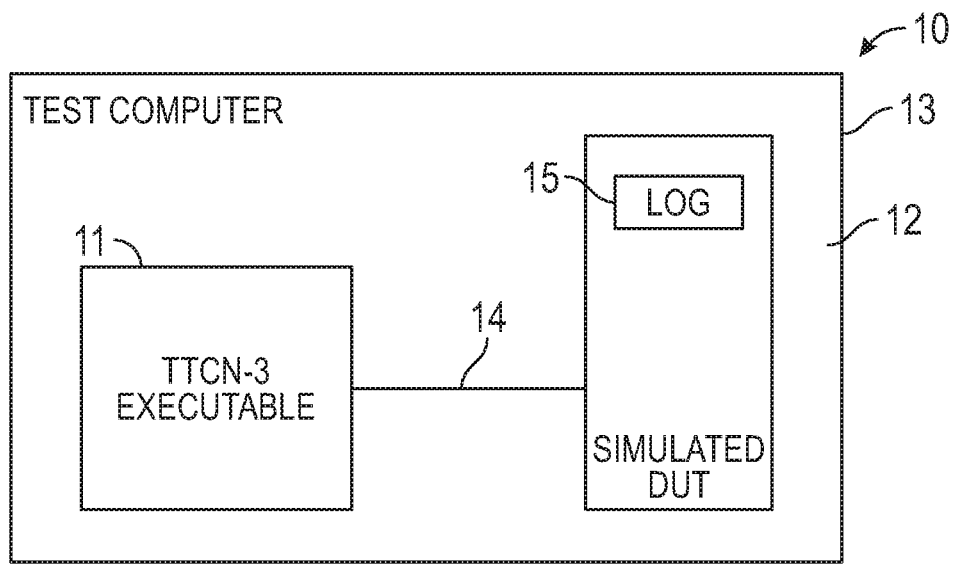
FIG. 2 shows a block diagram illustrating the structure of a test system for testing test-cases according to one aspect of the present invention.

FIG. 2 shows a block diagram illustrating the structure of a test system for testing test-cases according to one aspect of the present invention.

The test system in FIG. 2 is denoted by reference symbol 10. The test system 10 is in this example a TTCN-3 based test system which for example is defined in the ETSI standard (ES 201 873-6) and which is for example shown above in FIG. 1. The TTCN-3 based test system 10 is configured to deal with the interpretation or execution of TTCN-3 executable test suites (ETS).

For this purpose, the test system 10 comprises a TTCN-3 executable 11 (or shortly test executable), a simulated device under test (DUT) 12 and an external test computer 13.

In one aspect, the test executable 11 maybe part of a TTCN-3 test system implementation such as shown in FIG. 1. The test executable 11 comprises the compiled TTNC-3 code and preferably also a codec implementation.

The simulated DUT 12 comprises a pre-recorded log-file 15. For example, this pre-recorded log-file 15 is recorded based on an execution of a test-case with a real, non-simulated DUT, which corresponds to the simulated DUT. This way, protocol messages are generated and stored in the log-file 15 via the TCI test logging interface (not shown in FIG. 2). The pre-recorded log-file 15 describes as good as possible the known behavior (i.e. characteristics, functionality, performance, parameters, etc.) of the simulated DUT 12 (or real DUT).

The test computer 13 comprises the test executable 11, the simulated DUT 12 and a test runtime interface (TRI) 14 arranged between them. This test runtime interface 14 acts as a test interface for test simulation purposes.

The test computer 13 is configured to perform the testing of test-cases by executing the compiled TTCN-3 code and by exchanging via the test runtime interface 14 protocol messages with the simulated DUT 12 during the execution of the compiled TTCN-3 code. This means more or less, that for testing purposes the test computer 13 performs a replay of the pre-recorded log-files 15 of the simulated DUT 12.

Figure 3:
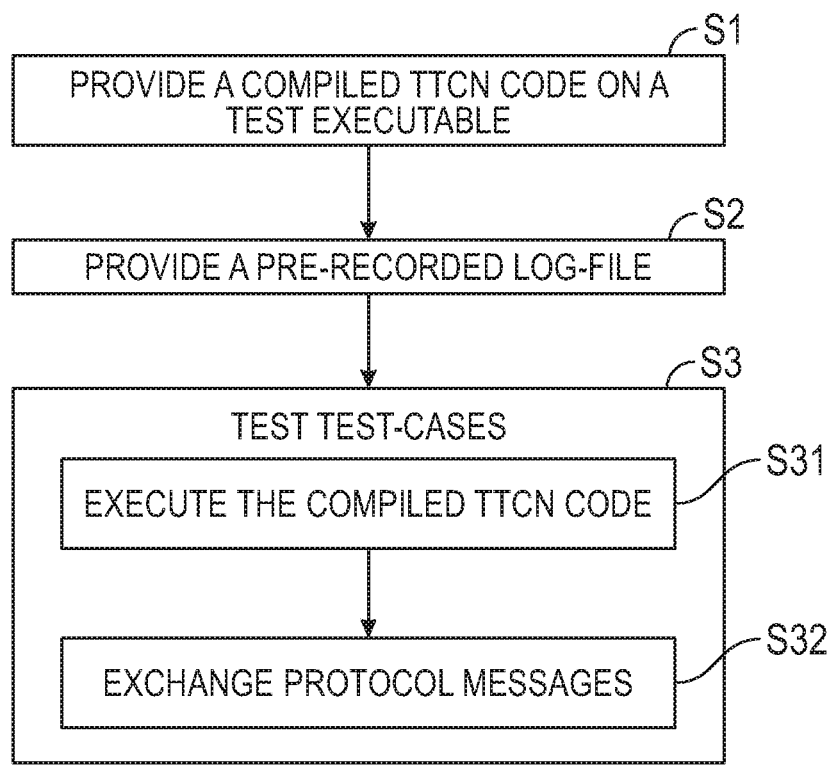
FIG. 3 shows a flow chart illustrating a TTCN-3 based test method for testing test-cases according to another aspect of the present invention.

FIG. 3 shows a flow chart illustrating a TTCN-3 based test method for testing test-cases according to another aspect of the present invention.

In one first step S1, a compiled TTCN code on a test executable is provided.

In another step S2, a pre-recorded log-file is provided. The pre-recorded log-file describes at least partially the behavior or performance of a simulated device under test.

In a final step S3, test-cases are tested. For this purpose, the simulated DUT along with the pre-recorded log-file are used and an external test computer is employed for running the tests. The testing comprises the sub-steps of executing S31 the compiled TTCN code and exchanging S32 protocol messages between the test computer and the simulated DUT during the execution of the compiled TTCN-3 code.

Although the present invention has been described in the above by way of preferred embodiments, it is not limited thereto, but rather can be modified in a wide range of ways. In particular, the invention can be changed or modified in various ways without deviating from the core of the invention.

LIST OF REFERENCE SIGNS 10 test system
11 TTCN-3 executable, test executable
12 simulated device under test, simulated DUT
13 test computer
14 test runtime interface, TRI
15 log-file
S1-S3 steps
S31, S32 sub-steps

The invention claimed is:
1. A testing and test control notation (TTCN)-based test system for testing test-cases in absence of a real device under test, the test system comprising:
a test executable comprising a compiled TTCN code, a simulated device under test (DUT) comprising a pre-recorded log-file which describes at least partially the behavior of the simulated DUT,
a test runtime interface between the test executable and the simulated DUT,
a test computer which is configured to perform the testing by executing the compiled TTCN code and by exchanging via the test runtime interface protocol messages with the simulated DUT during the execution of the compiled TTCN code;
wherein the method enables TTCN based tests in the absence of the real device under test and before the TTCN test code is fully developed and integrated within the test system.

2. The test system of claim 1, further comprising a test logging interface (TLI) for generating the pre-recorded log-file.

3. The test system of claim 1, wherein the test computer includes the test executable, the simulated DUT and the test runtime interface.

4. The test system of claim 1, wherein the test system is a TTCN-3 based test system and wherein the test executable comprises a compiled TTCN-3 code.

5. The test system of claim 1, wherein the test executable comprises compiled TTCN code and a coder-decoder (codec) implementation.

6. The test system of claim 5, wherein the test computer is further configured to determine programming defects in the codec implementation.

7. The test system of claim 1, wherein the test computer is further configured to determine programming defects in the compiled TTCN code during the execution of the compiled TTCN code.

8. The test system of claim 1, wherein the test computer is further configured to perform a regression test.

9. The test system of claim 1, wherein the test computer is further configured to automatically modify the pre-recorded log-file such to allow simulation of future features which are not yet implemented on the simulated DUT.

10. A testing and test control notation (TTCN)-based test method for testing test-cases in absence of a real device under test, the test method comprising:
providing a compiled TTCN code on a test executable;
providing a pre-recorded log-file which describes at least partially the behavior of a simulated device under test (DUT); and
testing at least one test-case by executing the compiled TTCN code and by exchanging messages with the simulated DUT during the execution of the compiled TTCN test code via a test runtime interface between test executable and simulated DUT protocol;
wherein the method enables TTCN based tests in the absence of the real device under test and before the TTCN test code is fully developed and integrated within the test system.

11. The test method of claim 10, wherein the pre-recorded log-file is recorded based on the execution of a real test-case on a real DUT.

12. The test method of claim 10, wherein providing a compiled TTCN code comprises providing a compiled TTCN-3 code on the test executable.

13. The test method of claim 10, wherein providing a compiled TTCN code comprises providing a compiled TTCN-3 code and a codec implementation.

14. The test method of claim 13, further comprising:
determining programming defects in the codec implementation during the execution of the compiled TTCN code.

15. The test method of claim 10, further comprising:
determining programming defects in the compiled TTCN code during the execution of the compiled TTCN code.

16. The test method of claim 10, wherein the testing is performed as a regression test.

17. The test method of claim 10, further comprising:
automatically modifying the pre-recorded log-file such to allow simulation of future features which are not yet implemented on the simulated DUT.

18. A non-transitory computer-readable recording medium, storing instructions executable by a computer processor, causing the computer processor to execute a testing and test control notation (TTCN)-based test method for testing test-cases in absence of a real device under test, the test method comprising:
providing a compiled TTCN code on a test executable;
providing a pre-recorded log-file which describes at least partially the behavior of a device under Test (DUT); and
testing at least one test-case by executing the compiled TTCN code and by exchanging messages with the simulated DUT during the execution of the compiled TTCN test code via a test runtime interface between test executable and simulated DUT protocol;
wherein a TTCN based test is performed in the absence of the real device under test and before the TTCN test code is fully developed and integrated within a test system.

* * * * *